United States Patent
Baskin et al.

(10) Patent No.: US 9,622,045 B2
(45) Date of Patent: Apr. 11, 2017

(54) MANAGING LOCATION PROFILES FOR PERSONAL AREA MAPS

(71) Applicants: Lonny Baskin, Tsur Hadassah (IL); Ariel Malamud, Jerusalem (IL)

(72) Inventors: Lonny Baskin, Tsur Hadassah (IL); Ariel Malamud, Jerusalem (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/228,388

(22) Filed: Mar. 28, 2014

(65) Prior Publication Data

US 2015/0281909 A1    Oct. 1, 2015

(51) Int. Cl.
| | |
|---|---|
| *H04W 24/00* | (2009.01) |
| *H04W 4/04* | (2009.01) |
| *H04W 4/00* | (2009.01) |
| *H04W 84/12* | (2009.01) |
| *H04W 84/18* | (2009.01) |
| *H04W 4/02* | (2009.01) |
| *H04W 64/00* | (2009.01) |

(52) U.S. Cl.
CPC ............. *H04W 4/04* (2013.01); *H04W 4/008* (2013.01); *H04W 4/021* (2013.01); *H04W 4/023* (2013.01); *H04W 4/025* (2013.01); *H04W 64/00* (2013.01); *H04W 84/12* (2013.01); *H04W 84/18* (2013.01)

(58) Field of Classification Search
CPC ....... H04W 4/04; H04W 4/021; H04W 64/00; H04W 84/12; H04W 84/18; H04W 4/008; H04W 4/023; H04W 4/025
See application file for complete search history.

(56) References Cited

U.S. PATENT DOCUMENTS

| | | | | |
|---|---|---|---|---|
| 2004/0203862 | A1* | 10/2004 | Wood et al. | 455/456.1 |
| 2007/0253343 | A1* | 11/2007 | Malik | 370/254 |
| 2009/0201169 | A1* | 8/2009 | d'Hont | G01S 13/003 340/8.1 |
| 2014/0310432 | A1* | 10/2014 | Wu | 710/10 |

* cited by examiner

*Primary Examiner* — Khalid Shaheed
(74) *Attorney, Agent, or Firm* — Evershed-Sutherland (US) LLP

(57) ABSTRACT

The present disclosure relates to computer-implemented systems and methods for managing location profiles for personal area maps. The method may include receiving, from a user, instructions to designate the device as a personal area map (PAM) controller. The method may also include determining a PAM profile associated with the user and identifying one or more objects associated with the PAM profile. Additionally, the method may include determining respective location information associated with the one or more objects. The method may also include generating, based at least in part on the respective location information, a PAM associated with the PAM profile.

21 Claims, 3 Drawing Sheets

MANAGING LOCATION PROFILES FOR PERSONAL AREA MAPS

TECHNICAL FIELD

The present disclosure generally relates to location determination, and in particular, to location profiles for personal area maps.

BACKGROUND

Conventional location techniques may rely on established technologies, such as, global positioning/navigation satellite systems (GPS/GNSS). However, GPS/GNSS technologies are not suitable for indoor applications, as microwave signals are susceptible to attenuation and scattering issues due to physical obstructions (e.g., roofs, walls, metal infrastructure, etc.). In addition, GPS/GNSS technologies may depend on a complex network infrastructure with expensive operating costs.

Various attempts have been made to develop indoor positioning/location systems that map a wireless-enabled device to a particular indoor area, e.g., a room, a shopping mall, etc. Typically, such indoor positioning/location systems may be based on Wi-Fi networks, employing Wi-Fi controllers and multiple network access points for location awareness. However, these indoor positioning systems may be associated with accuracy and reliability issues and, like GPS/GNSS technologies, they may also depend on a complex network infrastructure.

BRIEF DESCRIPTION OF THE DRAWINGS

Reference will now be made to the accompanying figures and diagrams, which are not necessarily drawn to scale, and wherein.

DETAILED DESCRIPTION

Figure 1:
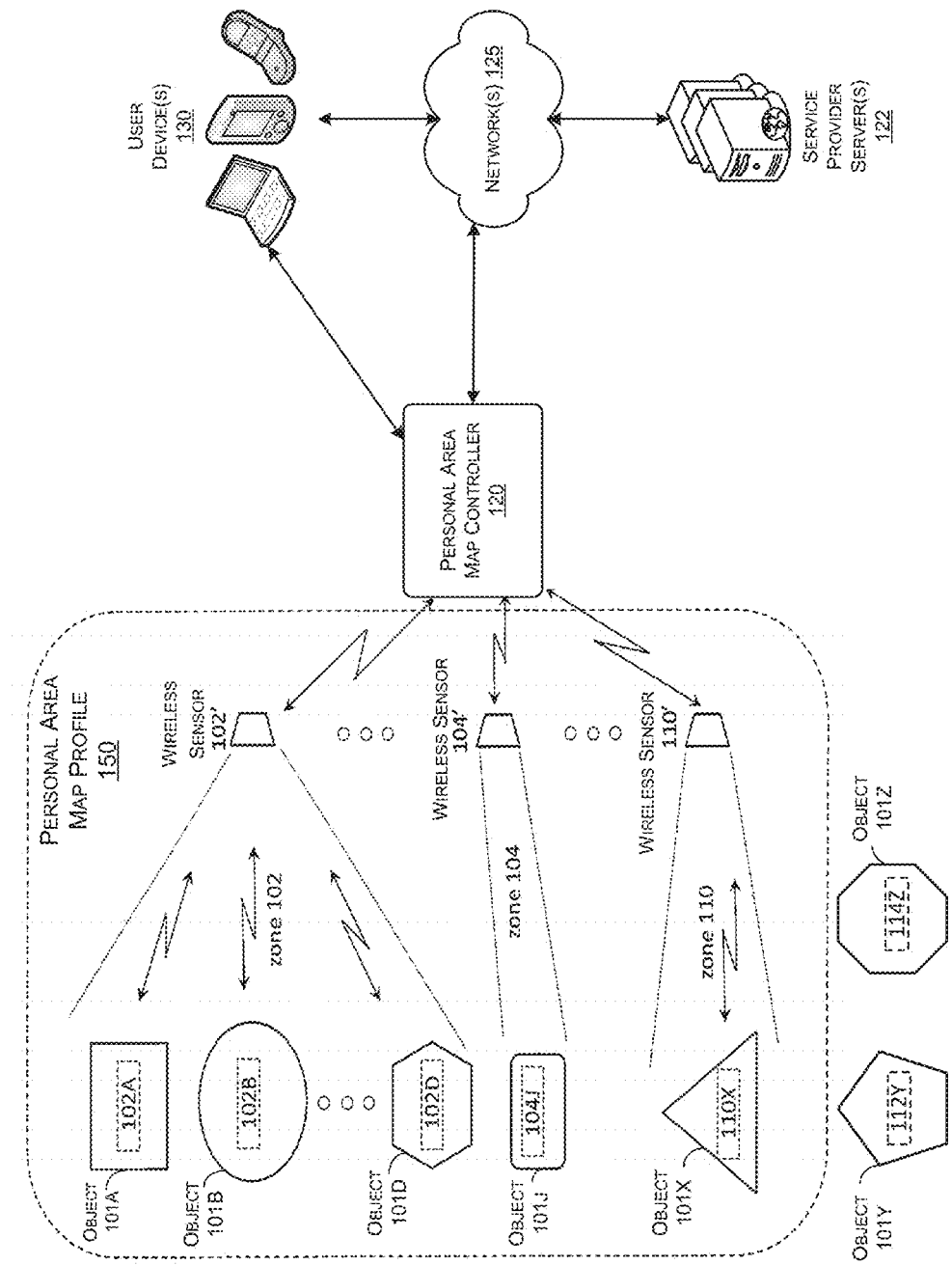
FIG. 1 shows a diagram of a system for managing location profiles for personal area maps, according to one or more example embodiments.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "user device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability. While the user device may be a wireless communication device, the user device may also be capable of wired communication.

As used herein, unless otherwise specified, the term "personal area map controller" (PAM controller) refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability. The PAM controller may be configured to access, determine, generate, transmit, receive, and/or otherwise facilitate the management of PAMs and/or PAM profiles. While the PAM controller may be a wireless communication device, the PAM controller may also be capable of wired communication.

As used herein, unless otherwise specified, the term "server" may refer to any computing device having a networked connectivity and configured to provide one or more dedicated services to clients, such as a mobile device. The services may include storage of data or any kind of data processing. One example of the server may include a web server hosting one or more web pages. Some examples of web pages may include social networking web pages. Another example of a server may be a cloud server that hosts web services for one or more computer devices.

As used herein, unless otherwise specified, the term "receiver" may refer to any device or component capable of receiving data, signals, information, etc. For example, a receiver may include an antenna or any other receiving device.

As used herein, unless otherwise specified, the term "transmitter" may refer to any device or component capable of transmitting data, signals, information, etc. For example, a transmitter may also include an antenna or any other transmission device.

As used herein, unless otherwise specified, the term "transceiver" may refer to any device or component capable of performing the functions of a receiver and/or a transmitter.

According to certain embodiments, the functionality provided by the receiver and the transmitter may be included in a single transceiver device.

The present disclosure relates to computer-implemented systems and methods for wireless communication via proximity detection. According to one or more example embodiments, a personal area map (PAM) system is provided that includes wireless tag elements which have respective first identifier information. The wireless tag elements may be attached and/or otherwise coupled to objects to be tracked. Additionally, wireless sensors may be arranged to provide corresponding zones of coverage that collectively define an area mapping for the location of the objects to be tracked. The wireless sensors may be associated with respective second identifier information and may be configured to wirelessly transmit a scanning signal that detects presence of the wireless tag elements, reads the respective first identifier information of the detected wireless tag elements, and wirelessly transmits the first identifier information, along with their respective second identifier information, to a PAM controller. The PAM controller may be configured to wirelessly communicate with the wireless sensors to receive the respective first identifier and second identifier information. The PAM controller may be further configured to correlate the second identifier information with first identifier information to determine which zones the detected tag elements may be located. Upon determination of these zone(s), the PAM controller may be configured to generate and/or otherwise provide personal area mapping information indicating the location of the objects within the zones of coverage.

In certain implementations, the PAM controller may also be configured to access a PAM profile. The PAM profile includes one or more objects, specific to the profile, to be tracked. For example, a "home" profile may be stored/accessed to track one or more household objects (e.g., keys, phones, books, persons, etc.). An "office" profile may be stored/accessed by the PAM controller to track one or more objects at an office location (e.g., physical files, keys, key fobs, briefcases, etc.). Furthermore, in certain embodiments, the PAM controller may also be configured to track the distance between itself and the objects in a particular PAM profile. Further, the PAM controller may be configured to generate and/or display a PAM that includes only the objects associated with the PAM profile.

The above principles, as well as perhaps others, are now illustrated with reference to FIG. 1, which depicts a personal area map (PAM) system 100 for managing location profiles for personal area maps. The PAM system 100 may include one or more wireless tag elements (e.g., tags) 102A-102D, 104J, 110X, 112Y, and 114Z that are placed on, attached, and/or otherwise coupled to objects to be tracked (e.g., objects 101A-D, 101J, 101X, 101Y, and 101Z). According to certain example embodiments, object 101A-D, 101*j*, and 101X may be included in a PAM profile 150 while objects 101Y and 101Z may not be included in the PAM profile 150.

The PAM system 100 may also include wireless sensors 102', 104', and 110' that may be configured to wirelessly detect the presence of tags 102A-102D, 104J, 110X, 112Y, and 114Z and, thus, the location of objects 101A-D, 101J, and 101X. Wireless sensors 102', 104', and 110' may wirelessly communicate and/or report the location information of tags 102A-102D, 104J, 110X, 112Y, and 114Z to a PAM controller 120. In turn, the PAM controller 120 may process the location information to map and/or track objects 101A-D, 101J, and 101X for presentation to a user. For instance, the PAM controller 120 may be configured to display a graphical presentation of the objects 101A-D, 101J, and 101X in relation to each other, the PAM controller 120, user devices 130 and/or their respective zones 102/104/110.

According to one or more embodiments, the PAM controller 120 may be configured to determine that it is to track objects associated with a particular PAM profile 150. For instance, a user of the PAM controller 120 may instruct the PAM controller 120 to access the PAM profile 150. In other implementations, the PAM controller 120 may be configured to determine the PAM profile 150 based at least in part on location information associated with the PAM controller 120. For example, the PAM controller 120 may use Global Positioning Satellite (GPS) information to determine that the PAM controller 120 is current located at coordinates corresponding to the PAM profile 150.

In yet other implementations, the PAM controller 120 may identify that it is within a predetermined distance from one or more of the wireless sensors 102'/104'/110'. For instance, the wireless sensors 102'/104'/110' may be configured to periodically transmit respective identification information. The PAM controller 120 may receive at least one of the respective identification information and access a PAM profile 150 corresponding to the identification information. Based on this determination, the PAM controller 120 may determine that the PAM profile 150 is to be accessed. Upon determining/accessing the PAM profile 150, the PAM controller 120 may be configured to track location information associated with objects 101A, 101B, 101D, 101J, and 101X and present such location information to the user. However, location information associated with objects 101Y and 101Z may not be presented to the user since these objects are not associated with the PAM profile 150.

According to other embodiments, the PAM controller 120 may be unable to determine and/or match its current location information to any stored PAM profiles 150. However, the PAM controller 120 may be still be configured to identify one or more wireless sensors that are not associated with any PAM profiles 150. To this end, the PAM controller 120 may be configured to suggest and/or generate a new PAM profile to include the wireless sensors and any information about wireless tags associated with the wireless sensors. As such, the PAM controller 120 may be configured to generate a new PAM for the new PAM profile and to store and/or associate the PAM and/or new PAM profile with a user of the user device 130.

As stated above, the PAM controller 120 may be configured to track location information associated with the objects included in the PAM profile 150 and their relative distances to the PAM controller 120. To this end, the PAM controller 120 may be configured to determine whether/when one of the tracked objects is located outside of a predetermined range from the PAM controller 120. If the PAM controller 120 determines that a tracked object (e.g., object 101A) is outside of a the predetermined range, the PAM controller 120 may generate an alert message, to the user, indicating that the object is out of range. For instance, the PAM controller 120 may determine its own location as well as the location of each of the tracked objects (e.g., objects 101A-D, J, and X). The PAM controller 120 may then calculate the distances between the determined locations. The PAM controller may then determine if one of the calculated distances is greater than a predetermined distance. If so, the PAM controller 120 may generate an alert message for the user. In certain implementations, the PAM controller 120 may instead calculate relative signal strengths between itself and the tracked objects (e.g., their associated tag elements) and determine whether any of the calculated signal strengths fall below a predetermined threshold. If so, the PAM controller 120 may generate an alert message for the user.

Objects 101A-D, J, and X may be personal items ranging from phones, remote controls, keys, passports, and wallets to clothing, notebooks, and dog leashes—and even persons of interest, such as, minor children, elderly persons, persons with certain disabilities, etc. Furthermore, according to certain embodiments, objects 101A-D, J, and X may be associated with multiple PAM profiles 150. In addition, a user (e.g., a user of the PAM controller 120 and/or the user device 130) may also be associated with multiple profiles. For instance, a user may be associated with both a "home" profile and a "work" profile. Moreover, a mobile phone belonging to the user may be included in both the "home" profile and the "work" profile. To this end, the PAM controller 120 may be configured to track the location of the mobile phone while the PAM controller is associated with either the "home" profile or the "work" profile associated with the user.

According to one or more embodiments, the PAM system 100 may also facilitate searches for objects (e.g., objects 101A-D, J, and X). For instance, a user may be unable to locate an object 101A. Thus, the user may wish to determine where object 101A is located. To this end, the PAM controller 120 may be configured to receive, from the user and/or user device 130, a search request for object 101A. In certain implementations, the search request may include an object identifier associated with object 101A. The PAM controller 120 may be configured to determine, based at least in part on the object identifier, one or more PAM profiles 150 that include the object 101A. Furthermore, the controller 120 may determine, based at least in part on the identified PAM profiles 150, corresponding PAMs that provide the location of the object 101A (e.g., via displaying the corresponding PAMs, textual formats, and/or any other format).

In certain implementations, if the PAM controller 120 is unable to locate the object 101A, the PAM controller may be configured to access historical tracked information associated with the object 101A. For instance, the PAM controller 120 may have access to a database that stores historical tracked information associated with objects tracked in the PAM system 100 (e.g., objects 101A-D, J, and/or X). The historical tracked information may indicate one or more past locations (e.g., within various PAMs and/or PAM profiles 150 associated with the user) associated with the object 101A. To this end, the PAM controller 120 may be configured to suggest, to the user, one or more of the past locations in which the user could search for the missing object 101A.

Tags 102A-102D, 104J, 110X, 112Y, and 114Z may comprise an antenna for transmitting and receiving a radiofrequency signal and a microchip or other suitable electromagnetic device/circuitry capable of electronically storing identification information in non-volatile memory as well as for processing information and modulating/demodulating the radiofrequency signal. The identification information may be supplied to, or read by, wireless sensors 102', 104', and 110' in response to scanning radiofrequency signals transmitted by wireless sensors 102', 104', and 110'.

Tags 102A-102D, 104J, and 110X may be passive devices that lack their own power source and are energized by being inductively coupled to a magnetic field generated by a radiofrequency signal, such as the scanning radiofrequency signals transmitted by wireless sensors 102', 104', and 110'. Alternatively and/or additionally, tags 102A-102D, 104J, 110X, 112Y, and 114Z may be configured as active devices with self-contained energy sources (e.g., batteries) and may be also capable of generating their own radiofrequency signals. Regardless of whether tags 102A-102D, 104J, 110X, 112Y, and 114Z are passive or active devices, the tags may be inconspicuous in size and take the form of a sticker, bracelet, wristband, label, card, printed stamp, key fob, pin, and/or other suitable media that may be attached and/or otherwise coupled to objects 101A-D, J, and X. For example, a tag key fob may be easily attached to a key ring, a tag bracelet may be worn by minor children or the elderly, and a tag sticker may be attached to an article of clothing.

Wireless sensors 102', 104', and 110' may comprise low power transceiver sensors configured to wirelessly transmit radiofrequency signals to scan and detect the presence of tags 102A-102D, 104J, and 110X within a certain zone of coverage. To perform scanning operations, wireless sensors 102', 104', and 110' may transmit encoded scanning radiofrequency signals that detect the presence of tags 102A-102D, 104J, 110X, 112Y, and 114Z and read the identification information of store therein. Alternatively, or in addition to, the scanning operation may comprise the transmission of radiofrequency signals with interrogation messages/commands by wireless sensors 102', 104', and 110' in which tags 102A-102D, 104J, 110X, 112Y, and 114Z respond with their identification information.

Moreover, wireless sensors 102', 104', and 110' may perform their scanning operations, either by reading tags 102A-102D, 104J, 110X, 112Y, and/or 114Z or by interrogating tags 102A-102D, 104J, 110X, 112Y, and/or 114Z, based on a periodic, polling basis. Alternatively, or in addition to, wireless sensors 102', 104', and 110' may perform their scanning operations based on commands or instructions provided by PAM controller 120.

As such, wireless sensors 102', 104', and 110' may include transceivers, transponders, modulation/demodulation, and/or memory circuitry as well as an antenna. Such circuitry may be configured with operational communication characteristics, such as radiofrequencies, distance ranges, data rates, encoding formats, duty cycles, etc. in accordance with bidirectional, low power communication protocols/standards, such as, for example, Bluetooth low energy (BLE), low power WiFi, Zigbee, Z-Wave, RFID, etc.

In some embodiments, the area corresponding to the PAM profile 150 may be divided into zones 102, 104, 110. The zones may be defined by the placement and zonal coverage of wireless sensors 102', 104', and 110', as illustrated in FIG. 1. Wireless sensors 102', 104', and 110' may be placed on fixed or stationary locations, such as, for example, walls, ceilings, door jambs, large furniture, porches, decks, windshields, rear view mirrors, etc. Additionally, wireless sensors 102', 104', and 110' may be battery powered for convenience as well as facilitating inconspicuous placement.

Returning to FIG. 1, each of wireless sensors 102', 104', and 110' may also be configured to wirelessly communicate and report location information associated with tags 102A-102D, 104J, 110X, 112Y, and 114Z as well as their own respective identification information to PAM controller 120. Such wireless communication may, again, be performed in accordance with low power bidirectional communication protocols/standards, such as, for example, Bluetooth low energy (BLE), low power WiFi, Zigbee, Z-Wave, RFID, etc., as noted above.

PAM controller 120 may be configured to wirelessly receive the location information of tags 102A-102D, 104J, 110X, 112Y, and 114Z reported by wireless sensors 102', 104', identification information of wireless sensors 102', 104', and 110' as well as transmit messages/commands to wireless sensors 102', 104', and 110'. PAM controller 120 may comprise a dedicated, special purpose computing device or may equally comprise a desktop, laptop, mobile device, smart phone, gaming device, tablet/notebook computer, personal digital assistant, etc.

Figure 2:
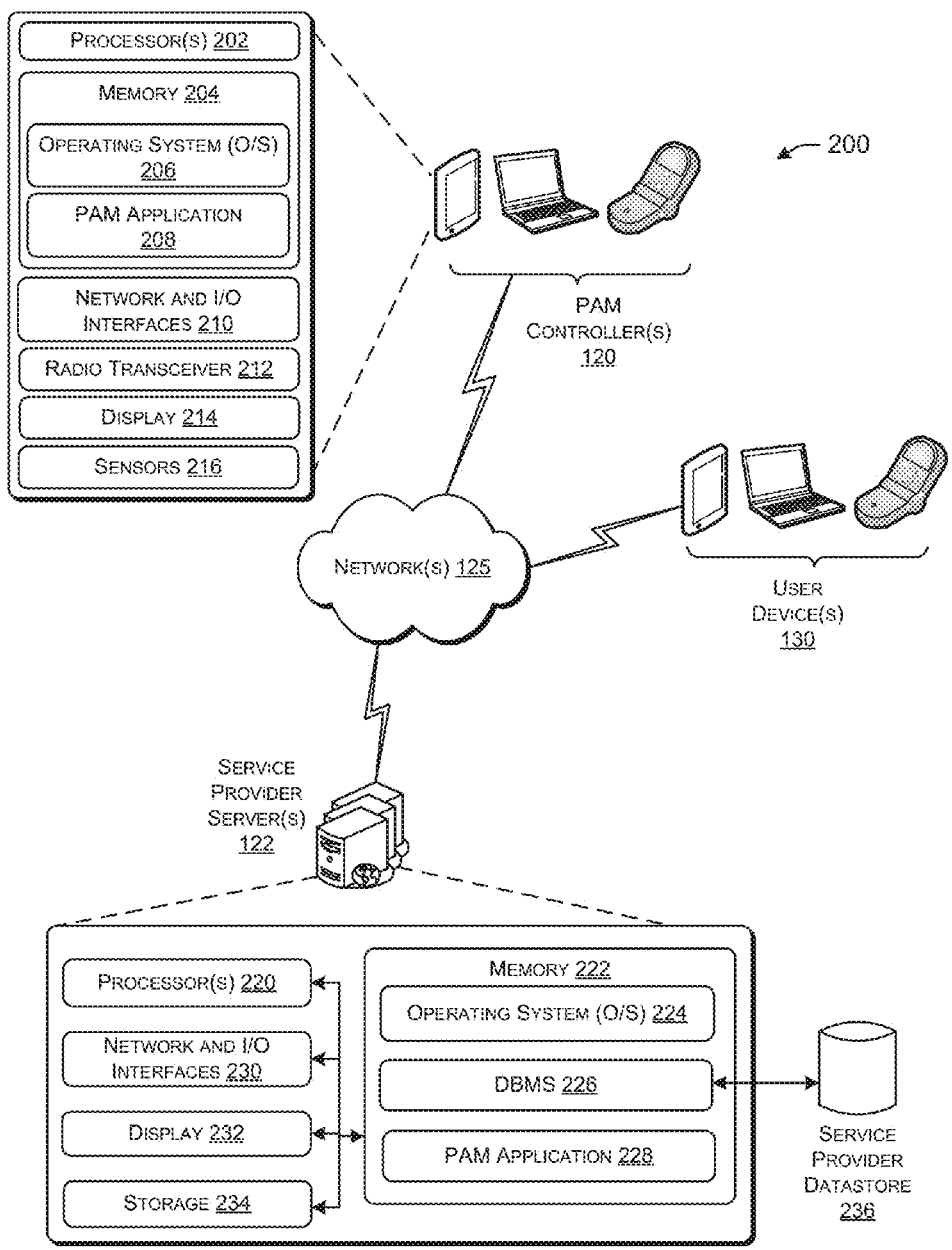
FIG. 2 shows a block diagram of a system for managing location profiles for personal area maps, according to one or more example embodiments.

Furthermore, as shown in FIG. 1, the PAM controller 120 may be in communication, via a network 125, with one or more user device(s) 130 and service provider servers 122, which are describe in more detail with reference to FIG. 2.

Turning now to FIG. 2, a block diagram of a PAM management system 200 is provided in accordance with one or more example embodiments. The system 200 may include one or more PAM controller(s) 120. In general, the PAM controller 120 may refer to, and/or may be incorporated as part of, any type of electronic device, and more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The PAM controller(s) 120 may include one or more computer processors 202, a memory 204 storing an operating system 206 and a PAM application 208, network and I/O interfaces 210, a radio transceiver 212, a display 214, and one or more sensors 216 (e.g., microphone, motion sensors, location sensors, GPS sensors, etc.). Such sensors may be capable of gathering information associated with a present environment of the PAM controller(s) 120, or similar hardware devices, such as a camera, microphone, antenna, or Global Positioning Satellite (GPS) device.

The computer processors 202 may comprise one or more cores and may be configured to access and execute (at least in part) computer-readable instructions stored in the memory 204. The one or more computer processors 202 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The PAM controller 120 may also include a chipset (not shown) for controlling communications between the one or more processors 202 and one or more of the other components of the PAM controller 120. In certain embodiments, the PAM controller 120 may be based on an Intel® architecture or an ARM® architecture, and the processor(s) and chipset may be from a family of Intel® processors and chipsets. The one or more processors 202 may also include one or more application-specific integrated circuits (ASICs) or application-specific standard products (ASSPs) for handling specific data processing functions or tasks.

The memory 204 may comprise one or more computer-readable storage media (CRSM). In some embodiments, the memory 204 may include non-transitory media such as random access memory (RAM), flash RAM, magnetic media, optical media, solid state media, and so forth. The memory 204 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 204 may store an operating system 206 that includes a plurality of computer-executable instructions that may be implemented by the computer processor to perform a variety of tasks to operate the interface(s) and any other hardware installed on the PAM controller 120. The operating system 206 may include any operating system now known or which may be developed in the future including, but not limited to, any server operating system, any mainframe operating system, or any other proprietary or freely available operating system. The memory 204 may also store content that may be displayed by the PAM controller 120 or transferred to other devices (e.g., headphones) to be displayed or played by the other devices. The memory 204 may also store content received from the other devices. The content from the other devices may be displayed, played, or used by the PAM controller 120 to perform any necessary tasks or operations that may be implemented by the computer processor or other components in the PAM controller 120.

Furthermore, the memory 204 may store an update module 208, which may be configured to communicate with one or more service provider server(s) 118. For instance, the update module 208 may facilitate the user inputting and/or other transmitting any desired updates to status information associated with a package. For instance, the update module 208 may be configured to provide a user interface for the user to enter such updates and to transmit the updates to the service provider server(s) 118.

The network and I/O interfaces 210 may also comprise one or more communication interfaces or network interface devices to provide for the transfer of data between the PAM controller 120 and another device (e.g., network server) via a network (not shown). The communication interfaces may include, but are not limited to, personal area networks (PANs), wired local area networks (LANs), wireless local area networks (WLANs), wireless wide area networks (WWANs), and so forth. The PAM controller 120 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the PAM controller 120 and another device such as an access point, a host computer, a server, a router, a reader device, and the like. The network may include, but is not limited to: the Internet, a private network, a virtual private network, a wireless wide area network, a local area network, a metropolitan area network, a telephone network, and so forth.

The display 214 may include, but is not limited to, a liquid crystal display, a light-emitted diode display, an E-Ink™ display as made by E Ink Corp. of Cambridge, Mass., or any other similar type of output device. The display 214 may be used to show content to a user in the form of text, images, or video. In certain instances, the display 214 may also operate as a touch screen display that may enable the user to initiate commands or operations by touching the screen using certain finger or hand gestures.

According to one or more embodiments, the PAM controller 120 may be in communication, via one or more networks 125, with one or more service provider server(s) 122 and one or more user device(s) 130. In some implementations, the user device(s) 130 may include one or more components of the PAM controller 120. In other implementations, the user device(s) 130 may include the PAM controller 120 and its functionality in its entirety. In yet other implementations, the user device 130 may be a separate device, and may includes its own components, such as its own processors, memory, operating system, network and I/O interfaces, transceivers, displays, and/or the like.

As used herein, unless otherwise specified, the term "server" may refer to any computing device having a networked connectivity and configured to provide one or more dedicated services to clients, such as a PAM controller 120 and/or user devices 130. The services may include storage of data or any kind of data processing.

The service provider server(s) 122 may include one or more processors 220 and a memory 222. The memory 222 may store an operating system 224, a database management system (DBMS) 226 and a PAM application 228. In addition, the service provider server(s) 122 may also include network and I/O interfaces 230, a display 232, and a storage 234. Furthermore the DBMS 226 may be in communication with a service provider datastore 140. While any of the above mentioned components in the PAM controller 120 and the service provider server(s) 122 may hereinafter be referred to in the singular, it will be appreciated that any future references to these components also contemplate them in a plurality.

The processors 220 may comprise one or more cores and may be configured to access and execute (at least in part) computer-readable instructions stored in the memory 222. The one or more computer processors 220 may include, without limitation (and similarly to the processors 202 in the PAM controller 120), a CPU, DSP, RISC, CISC, a microprocessor, a microcontroller, a field programmable gate array (FPGA), or any combination thereof. The service provider server 122 may also include a chipset (not shown) for controlling communications between the one or more processors 220 and one or more of the other components of the service provider server 122. In certain embodiments, the service provider server 122 may be based on an Intel® architecture or an ARM® architecture, and the processor(s) and chipset may be from a family of Intel® processors and chipsets. The one or more processors 220 may also include one or more application-specific integrated circuits (ASICs) or application-specific standard products (ASSPs) for handling specific data processing functions or tasks.

The memory 222 may comprise one or more computer-readable storage media (CRSM). Similar to the memory 204 in the PAM controller 120, the memory 222 may include non-transitory media such as RAM, flash RAM, magnetic media, optical media, solid state media, and so forth. The memory 222 may be volatile or non-volatile and may also be provided as a computer program product including a transitory machine-readable signal (in compressed or uncompressed form). Additionally, the memory 222 may store an operating system 224 that includes a plurality of computer-executable instructions that may be implemented by the computer processor to perform a variety of tasks to operate the interface(s) and any other hardware installed on the service provider server 122. The operating system 224 may include any operating system now known or which may be developed in the future including, but not limited to, any server operating system, any mainframe operating system, or any other proprietary or freely available operating system.

It should be appreciated that any data and/or computer-executable instructions stored in the memory 222 may be additionally, or alternatively, stored in the data storage 234 and/or in one or more other datastores. The DBMS 226 depicted as being loaded into the memory 222 may support functionality for accessing, retrieving, storing, and/or manipulating data stored in external datastore(s) (e.g., the service provider datastore(s) 140), data stored in the memory 222, and/or data stored in the data storage 234. For example, the DBMS 226 may be configured to retrieve user account data (e.g., information related to status information of a package) from service provider datastore(s) 140 responsive to receipt of the request from the service provider server 122. The DBMS 226 may use any of a variety of database models (e.g., relational model, object model, etc.) and may support any of a variety of query languages.

The network and I/O interfaces 230 may also comprise one or more communication interfaces or network interface devices to provide for the transfer of data between the service provider server 122 and another device (e.g., network server) via a network (not shown). The communication interfaces may include, but are not limited to, personal area networks (PANs), wired local area networks (LANs), wireless local area networks (WLANs), wireless wide area networks (WWANs), and so forth. As such, the service provider server 122 may be coupled to the network via a wired connection and/or a wireless connection. The communication interfaces may utilize acoustic, radio frequency, optical, or other signals to exchange data between the service provider server 122 and another device such as an access point, a host computer, a server, a router, a reader device, and the like. The network may include, but is not limited to, the Internet, a private network, a virtual private network, a wireless wide area network, a local area network, a metropolitan area network, a telephone network, and so forth.

The display 232 may include, but is not limited to, a liquid crystal display, a light-emitted diode display, an E-Ink™ display as made by E Ink Corp. of Cambridge, Mass., or any other similar type of output device. The display 232 may be used to show content to a user in the form of text, images, or video. In certain instances, the display 232 may also operate as a touch screen display that may enable the user to initiate commands or operations by touching the screen using certain finger or hand gestures.

The service provider server 122 may further comprise storage 234, such as removable storage and/or non-removable storage including, but not limited to, magnetic storage, optical disk storage, and/or tape storage. Storage 234 may provide non-transient storage of computer-executable instructions and other data. The storage 234 may include storage that is internal and/or external to the user service provider server 122.

Broadly, the PAM application 208 may be configured to execute instructions to facilitate the functionality of the PAM controller 120 as described above with reference to FIG. 1. Furthermore, the service provider server 122 may also include a PAM application 228 that provides similar functionality. For example, the service provider server 122 may be configured to store one or more PAM profiles, which may be stored in a service provider datastore. The PAM controller 120 may determine that a particular PAM profile 150 is to be accessed, and may request the PAM profile 150 from the service provider server 150.

According to certain embodiments, the PAM controller 120 may also be in communication with one or more user device(s) 130. The user device(s) 130 may have the capability of functioning as a PAM controller 120 and may be designated as such, either by the user and/or automatically by the service provider server 122. In some implementations, the PAM controller 120, including any of its hardware or software components, may be included within the user device(s) 130. In other implementations, the user devices 130 may be designated as "slaves" to the PAM controller 120. To this end, the user devices 130 may be configured to calculate respective distances between themselves and one or more objects of a PAM profile 150. Such distances may be communicated to the PAM controller 120, which may be configured to provide such information to the user upon request. For instance, the PAM profile 150 may be a "home" profile used to track the location of one or more home objects. The PAM controller may 120 may be located remotely from the "home" while a user device 130, such as a notebook computer, may be located at the home. The notebook computer may be operating as a slave to the PAM controller 120. As such, the PAM controller 120 may be configured to determine the respective distances between the one or more home objects and the notebook computer.

According to one or more embodiments, the service provider server 122 may designate the PAM controller 120 from the one or more user devices 130, depending on the particular PAM profile 150. For example, the service provider server 122 may identify the user device 130 closest to the objects associated with the PAM profile 150. As such, the service provider server 122 may designate the identified user device 130 as the PAM controller 120.

Figure 3:
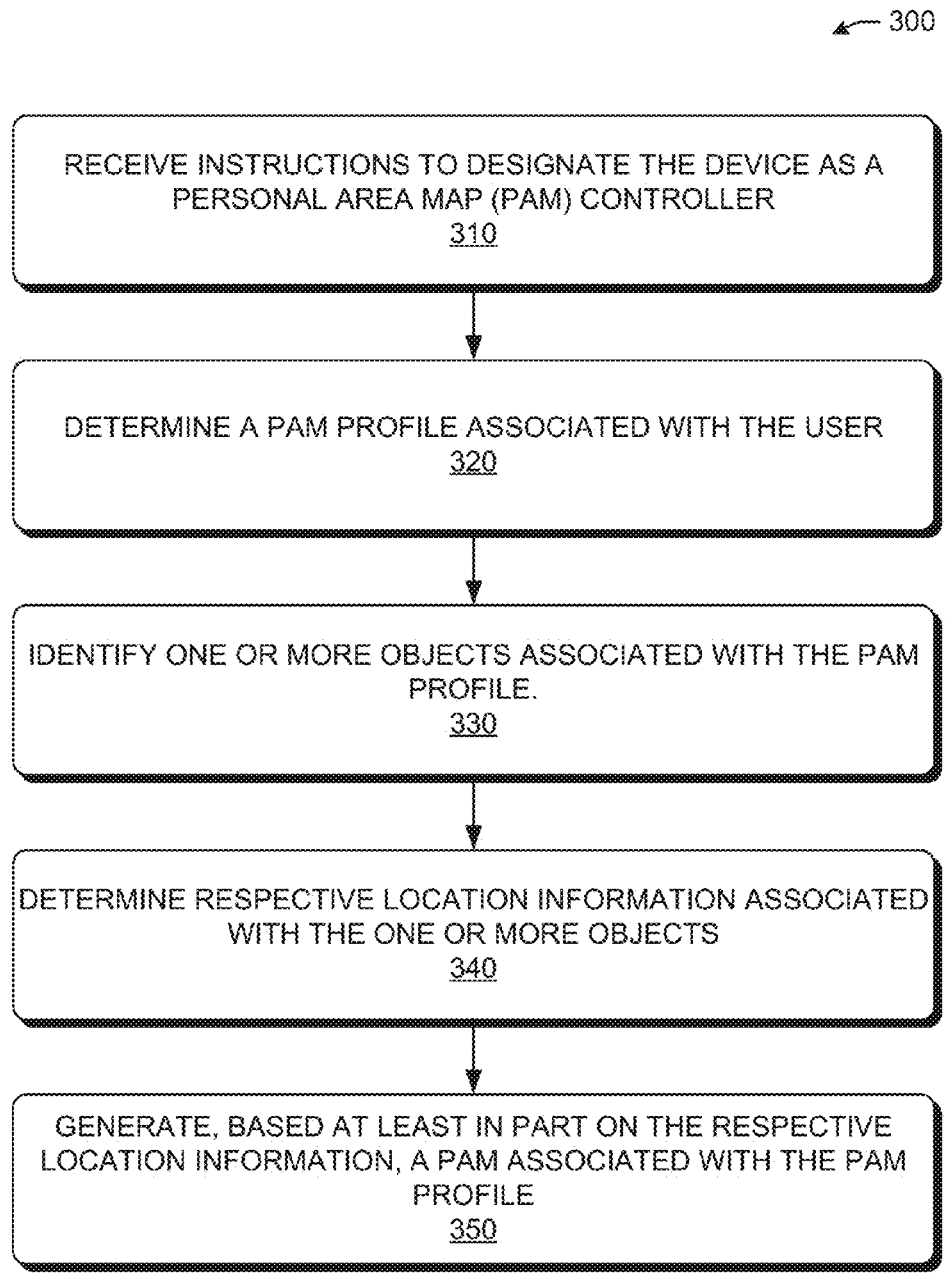
FIG. 3 show a flow diagram for managing location profiles for personal area maps, according to one or more example embodiments.

Referring now to FIG. 3, a flow diagram of a method 300 is illustrated for managing location profiles for personal area maps in accordance with one or more example embodiments. The method 300 may generally describe operations from the perspective of a device designated as a PAM controller 120. As such, the method 300 may begin in block 310, where the device may receive instructions to designate the device as a PAM controller 120. In block 320, the device may determine a PAM profile (e.g., PAM profile 150) associated with a user of the device.

In block 330, the device may identify one or more objects associated with the PAM profile 150 (e.g., objects 101A-D, J, and X) that are to be tracked. In block 340, the device may determine respective location information associated with the one or more objects. In block 350, the device may generate, based at least in part on the respective location information, a personal area map associated with the PAM profile 150.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

Example 1 is a device, comprising: a radio transceiver; at least one processor; and at least one memory storing computer-executable instructions, that when executed by the at least one processor, causes that at least one processor to: receive, from a user, instructions to designate the device as a personal area map (PAM) controller; determine a PAM profile, from a plurality of PAM profiles, associated with the user; identify one or more objects associated with the PAM profile; determine respective location information associated with the one or more objects; and generate, based at least in part on the respective location information, a PAM associated with the PAM profile.

In Example 2, the subject matter of Example 1 can optionally include that the instructions to determine the PAM profile further comprise instructions to: determine location information associated with the device; select the PAM profile based at least in part on the location information associated with the device.

In Example 3, the subject matter of Example 1 can optionally include that the instructions to determine the PAM profile further comprise instructions to: receive, from the user, a selection of the PAM profile.

In Example 4, the subject matter of Example 1 can optionally include that the one or more objects are coupled to respective wireless tag elements.

In Example 5, the subject matter of Example 4 can optionally include that the respective wireless tag elements are in communication with one or more wireless sensors to track to the location of the respective wireless tag elements.

In Example 6, the subject matter of Example 5 can optionally include that the instructions to determine respective location information associated with the one or more objects further comprise instructions to: receive the respective location information from the one or more wireless sensors.

In Example 7, the subject matter of Example 1 can optionally include that the instructions further cause the at least one processors to: identify a first object of the one or more objects; and determine, based at least in part on location information associated with the first object and location information associated with the device, whether the first object is outside of a predetermined distance from the device.

In Example 8, the subject matter of Example 7 can optionally include that the instructions further cause the at least one processor to: generate, upon determination that the first object is outside the predetermined distance from the device, an alert message.

In Example 9, the subject matter of Example 1 can optionally include that the instructions further cause the at least one processors to: identify a slave device in communication with the device and the one or more objects; and determine respective distances between the slave device and the one or more objects.

Example 10 is a method for establishing wireless communication, comprising: receiving, by a computer comprising one or more processors, from a user, instructions to designate the device as a personal area map (PAM) controller; determining, by the computer, a PAM profile, from a plurality of PAM profiles, associated with the user; identifying, by the computer, one or more objects associated with the PAM profile; determining, by the computer, respective location information associated with the one or more objects; and generating, based at least in part on the respective location information, a PAM associated with the PAM profile.

In Example 11, the subject matter of Example 10 can optionally include determining location information associated with the computer; selecting the PAM profile based at least in part on the location information associated with the computer.

In Example 12, the subject matter of Example 10 can optionally include that determining the PAM profile further comprises: receiving, from the user, a selection of the PAM profile.

In Example 13, the subject matter of Example 10 can optionally include that the one or more objects are coupled to respective wireless tag elements.

In Example 14, the subject matter of Example 13 can optionally include that the respective wireless tag elements are in communication with one or more wireless sensors to track to the location of the respective wireless tag elements.

In Example 15, the subject matter of Example 14 can optionally include determining respective location information associated with the one or more objects further comprises: receiving the respective location information from the one or more wireless sensors.

In Example 16, the subject matter of Example 10 can optionally include identifying a first object of the one or more objects; and determining, based at least in part on location information associated with the first object and location information associated with the computer, whether the first object is outside of a predetermined distance from the computer.

In Example 17, the subject matter of Example 16 can optionally include generating, upon determination that the first object is outside the predetermined distance from the computer, an alert message.

In Example 18, the subject matter of Example 10 can optionally include identifying a slave device in communication with the computer and the one or more objects; and determining respective distances between the slave device and the one or more objects.

In Example 19 is a non-transitory computer-readable medium comprising instructions, that when executed by at least one processor, cause the at least one processor to: receive, from a user, a designation as a personal area map (PAM) controller; determine a PAM profile, from a plurality of PAM profiles, associated with the user; identify one or more objects associated with the PAM profile; determine respective location information associated with the one or more objects; and generate, based at least in part on the respective location information, a PAM associated with the PAM profile.

In Example 20, the subject matter of Example 19 can optionally include instructions that cause the at least one processor to: determine current location information; select the PAM profile based at least in part on the current location information.

In Example 21, the subject matter of Example 19 can optionally include that the instructions to determine the PAM profile further comprise instructions to: receive, from the user, a selection of the PAM profile.

Example 22, the subject matter of Example 19 can optionally include that the one or more objects are coupled to respective wireless tag elements.

In Example 23, the subject matter of Example 22 can optionally include that the respective wireless tag elements are in communication with one or more wireless sensors to track to the location of the respective wireless tag elements.

In Example 24, the subject matter of Example 23 can optionally include that the instructions to determine respective location information associated with the one or more objects further comprise instructions to: receive the respective location information from the one or more wireless sensors.

In Example 25, the subject matter of Example 19 can optionally include that the instructions further cause the at least one processors to: identify a first object of the one or more objects; and determine, based at least in part on location information associated with the first object and location information associated with a device, whether the first object is outside of a predetermined distance from the device.

In Example 26, the subject matter of Example 25 can optionally include that the instructions further cause the at least one processor to: generate, upon determination that the first object is outside the predetermined distance from the device, an alert message.

In Example 27, the subject matter of Example 19 can optionally include that the instructions further cause the at least one processors to: identify a slave device in communication with the device and the one or more objects; and determine respective distances between the slave device and the one or more objects.

Example 28 is an apparatus for establishing wireless communication, comprising: means for receiving, by a computer comprising one or more processors, from a user, instructions to designate the device as a personal area map (PAM) controller; means for determining, by the computer, a PAM profile, from a plurality of PAM profiles, associated with the user; means for identifying, by the computer, one or more objects associated with the PAM profile; means for determining, by the computer, respective location information associated with the one or more objects; and means for generating, based at least in part on the respective location information, a PAM associated with the PAM profile.

In Example 29, the subject matter of Example 28 can optionally include means for determining location information associated with the computer; means for selecting the PAM profile based at least in part on the location information associated with the computer.

In Example 30, the subject matter of Example 28 can optionally include that determining the PAM profile further comprises: means for receiving, from the user, a selection of the PAM profile.

In Example 31, the subject matter of Example 28 can optionally include that the one or more objects are coupled to respective wireless tag elements.

In Example 32, the subject matter of Example 31 can optionally include that the respective wireless tag elements are in communication with one or more wireless sensors to track to the location of the respective wireless tag elements.

In Example 33, the subject matter of Example 32 can optionally include that determining respective location information associated with the one or more objects further comprises: means for receiving the respective location information from the one or more wireless sensors.

In Example 34, the subject matter of Example 28 can optionally include means for identifying a first object of the one or more objects; and means for determining, based at least in part on location information associated with the first object and location information associated with the computer, whether the first object is outside of a predetermined distance from the computer.

In Example 35, the subject matter of Example 34 can optionally include means for generating, upon determination that the first object is outside the predetermined distance from the computer, an alert message.

In Example 36, the subject matter of Example 18 can optionally include means for identifying a slave device in communication with the computer and the one or more objects; and means for determining respective distances between the slave device and the one or more objects.

What is claimed is:

1. A device; comprising: a radio transceiver;
at least one processor; and
at least one memory storing computer-executable instructions, that when executed by the at least one processor, causes that at least one processor to:
receive, from a user, instructions to designate the device as a personal area map (PAM) controller;
determine a PAM profile, from a plurality of PAM profiles, associated with the user, wherein an area associated with the PAM profile is divided into one or more zones based at least in part, on one or more locations of one or more wireless sensors; identify one or more objects associated with the PAM profile;
identify a slave device in communication with the device and the one or more objects; determine respective location information associated with the one or more objects in the one or more zones, wherein the respective location information is received from the one or more wireless sensors;
determine respective distances between the slave device and the one or more objects; and generate, based at least in part on one or more of the respective location information and the respective distances, a PAM associated with the PAM profile.

2. The device of claim 1, wherein the instructions to determine the PAM profile further comprise instructions to:
determine location information associated with the device;
select the PAM profile based at least in part on the location information associated with the device.

3. The device of claim 1, wherein the instructions to determine the PAM profile further comprise instructions to:
receive, from the user, a selection of the PAM profile.

4. The device of claim 1, wherein the one or more objects are coupled to respective wireless tag elements.

5. The device of claim 4, wherein the respective wireless tag elements are in communication with the one or more wireless sensors to track to the location of the respective wireless tag elements.

6. The device of claim 1, wherein the instructions further cause the at least one processors to:
identify a first object of the one or more objects; and
determine, based at least in part on location information associated with the first object and location information associated with the device, whether the first object is outside of a predetermined distance from the device.

7. The device of claim 6, wherein the instructions further cause the at least one processor to:
generate, upon determination that the first object is outside the predetermined distance from the device, an alert message.

8. A method for establishing wireless communication, comprising: receiving, by a computer comprising one or more processors, from a user, instructions to:
designate a device as a personal area map (PAM) controller; determining, by the computer, a PAM profile, from a plurality of PAM profiles, associated with the user, wherein an area associated with the PAM profile is divided into a one or more zones based at least in part on one or more locations of one or more wireless sensors;
identifying, by the computer, one or more objects associated with the PAM profile; identifying, by the computer, a slave device in communication with the device and the one or more objects;
determining, by the computer, respective location information associated with the one or more objects in the one or more zones, wherein the respective location information is received from the one or more wireless sensors;
determining, by the computer, respective distances between the slave device and the one or more objects; and
generating, based at least in part on one or more of the respective location information and the respective distances, a PAM associated with the PAM profile.

9. The method of claim 8, further comprising:
determining location information associated with the computer;
selecting the PAM profile based at least in part on the location information associated with the computer.

10. The method of claim 8, wherein determining the PAM profile further comprises:
receiving, from the user, a selection of the PAM profile.

11. The method of claim 8, wherein the one or more objects are coupled to respective wireless tag elements.

12. The method of claim 11, wherein the respective wireless tag elements are in communication with the one or more wireless sensors to track to the location of the respective wireless tag elements.

13. The method of claim 8, further comprising:
identifying a first object of the one or more objects; and
determining, based at least in part on location information associated with the first object and location information associated with the computer, whether the first object is outside of a predetermined distance from the computer.

14. The method of claim 13, further comprising:
generating, upon determination that the first object is outside the predetermined distance from the computer, an alert message.

15. A non-transitory computer-readable medium comprising instructions, that when executed by at least one processor, cause the at least one processor to:
receive, from a user, a designation as a personal area map (PAM) controller; determine a PAM profile, from a plurality of PAM profiles, associated with the user, wherein an area associated with the PAM profile is divided into a one or more zones based at least in part on one or more locations and one or more zonal coverages of one or more wireless sensors:
identify one or more objects associated with the PAM profile,
identify a slave device in communication with the device and the one or more objects; determine respective location information associated with the one or more objects in the one or more zones, wherein the respective location information is received from the one or more wireless sensors;
determine respective distances between the slave device and the one or more objects; and generate, based at least in part on one or more of the respective location information and the respective distances, a PAM associated with the PAM profile.

16. The computer-readable medium of claim 15, further comprising instructions that cause the at least one processor to:
determine current location information;
select the PAM profile based at least in part on the current location information.

17. The non-transitory computer-readable medium of claim 15, wherein the instructions to determine the PAM profile further comprise instructions to:
receive, from the user, a selection of the PAM profile.

18. The non-transitory computer-readable medium of claim 15, wherein the one or more objects are coupled to respective wireless tag elements.

19. The non-transitory computer-readable medium of claim 18, wherein the respective wireless tag elements are in communication with the one or more wireless sensors to track to the location of the respective wireless tag elements.

20. The non-transitory computer-readable medium of claim 15, wherein the instructions further cause the at least one processors to:
identify a first object of the one or more objects; and
determine, based at least in part on location information associated with the first object and location information associated with a device, whether the first object is outside of a predetermined distance from the device.

21. The non-transitory computer-readable medium of claim 20, wherein the instructions further cause the at least one processor to:
generate, upon determination that the first object is outside the predetermined distance from the device, an alert message.

* * * * *